United States Patent [19]

Magder

[11] 4,323,544
[45] Apr. 6, 1982

[54] PROCESS AND SORBENT SYSTEM FOR REMOVING NITROGEN AND OTHER OXIDES FROM GAS STREAMS

[75] Inventor: Jules Magder, Princeton, N.J.

[73] Assignee: Noxso Corporation, Reston, Va.

[21] Appl. No.: 144,078

[22] Filed: Apr. 28, 1980

Related U.S. Application Data

[60] Continuation of Ser. No. 54,337, Jul. 2, 1979, abandoned, which is a continuation of Ser. No. 945,769, Sep. 25, 1978, abandoned, and a continuation of Ser. No. 871,920, Jan. 23, 1978, abandoned, which is a continuation of Ser. No. 745,944, Nov. 29, 1976, abandoned, which is a continuation of Ser. No. 625,275, Oct. 23, 1975, abandoned, which is a continuation of Ser. No. 444,191, Feb. 15, 1974, abandoned, which is a division of Ser. No. 236,483, Jun. 16, 1972, abandoned.

[51] Int. Cl.³ .............................................. C01B 53/34
[52] U.S. Cl. ................................ 423/239; 423/244 R; 423/567 R; 423/574 R; 252/411 S

[58] Field of Search ............... 423/244, 570, 574, 576; 252/411 S, 567

[56] References Cited

U.S. PATENT DOCUMENTS

| 2,992,884 | 7/1961 | Bienstock et al. | 423/244 |
| 3,551,093 | 12/1970 | Myers et al. | 423/244 A |
| 3,725,531 | 4/1973 | Pearson et al. | 423/244 |
| 3,755,535 | 8/1973 | Naber | 423/244 |
| 4,283,380 | 8/1981 | Voirin et al. | 423/574 |

Primary Examiner—G. O. Peters
Attorney, Agent, or Firm—Sprung, Felfe, Horn, Lynch & Kramer

[57] ABSTRACT

Novel sorbents comprising (a) an alumina component comprising alumina of the surface area of at least 20 and preferably 100 square meters per gram, and (b) a salt, or mixtures of salts, of an alkali or alkaline earth metal, especially oxides, hydroxides, carbonates, nitrates, acetates or aluminates of sodium and potassium, are outstandingly effective for the removal of nitrogen oxides and sulfur oxides from waste gas streams.

62 Claims, No Drawings

PROCESS AND SORBENT SYSTEM FOR REMOVING NITROGEN AND OTHER OXIDES FROM GAS STREAMS

This is a continuation of application Ser. No. 54,337, filed July 2, 1979, now abandoned, which is a continuation of application Ser. No. 945,769, filed Sept. 25, 1978, (now abandoned), and, is a continuation of Ser. No. 871,920, filed Jan. 23, 1978 (now abandoned) which, in turn, is a continuation of Ser. No. 745,944, filed Nov. 29, 1976 (now abandoned) which, in turn, is a continuation of Ser. No. 625,275, filed Oct. 23, 1975 (not abandoned), which, in turn, is a continuation of Ser. No. 444,191, filed Feb. 15, 1974 (now abandoned) which, in turn, is a division of Ser. No. 263,483, filed June 16, 1972 (now abandoned).

The present invention relates to a sorbent system and process for removing pollutants from gas streams. More specifically, the invention is directed to removing nitrogen oxides from waste gas streams. In additional aspect, the method of the invention can be utilized to remove also sulfur oxides from gas streams.

The nitrogen oxides which are pollutants are nitric oxides (NO) and nitrogen dioxide ($NO_2$ or $N_2O_4$); the relatively inert nitric oxide is often only difficultly removed, relative to $NO_2$. The lower oxide of nitrogen, $N_2O$ (nitrous oxide) is not considered a pollutant at the levels usually found in ambient air, or as usually discharged from effluent sources. Sulfur oxides considered to be pollutants are sulfur dioxide and sulfur trioxide.

Particularly obnoxious sources of nitrogen and sulfur oxide pollutants are power plant stack gases, automobile exhaust gases, heating plate stack gases, and various industrial process effluents such as smelting operations and nitric and sulfuric acid plants.

Power plant emissions represent an especially formidable source of nitrogen oxides and sulfur oxides, by virtue of the very large tonnage of these pollutants in such emissions discharged into the atmosphere annually. Moreover, because of the low concentration of the pollutants in such emissions, typically 0.05% or less for nitrogen oxides and 0.3% or less for sulfur dioxide, their removal is difficult because very large volumes of gas must be treated.

Of the few practical systems which have hitherto been proposed for the removal of nitrogen oxides from power plant flue gases, all have certain disadvantages. One such process entails scrubbing the gas with a slurry of magnesium hydroxide or carbonate; the slurry is regenerated by treatment with ammonia. However, this process produces by-product ammonium nitrate which is difficult to dispose of, and also requires cooling and reheating the gas stream.

Various methods have been proposed for the removal of sulfur dioxide from power plant flue gases, but all of these have disadvantages. For example, wet scrubbing systems based on aqueous alkaline materials such as solutions of sodium carbonate or sodium sulfite, or slurries of magnesia, lime, or limestone, usually necessitate cooling the flue gas to about 55° C. in order to establish a water phase. At these temperatures the treated gas usually requires reheating in order to develop enough buoyancy to obtain an adequate plume rise from the stack. Moreover, such processes also create products involving a solid waste disposal problem.

Various solid phase processes for the removal of sulfur dioxide which have hitherto been proposed also have disadvantages. The use of limestone or dolomite, for example, to absorb sulfur dioxide creates a waste disposal problem if the solid is not regenerated.

Systems involving the regeneration of solid sorbents, for example, sodium aluminate (also known as "alkalized alumina") characteristically require hydrogen or mixtures of hydrogen and carbon monoxide to accomplish the regeneration. Such regeneration gases are often not conveniently available at the desired location, or else must be produced by relatively costly processes. Also, the sorbent is usually regenerated at relatively high temperatures, typically above 650° C. These high temperatures result in physical attrition and hence reduced lifetime of the sorbent, and also expend fuel in heating the sorbent from the sorption to the regeneration temperature.

The present invention provides a method of removing nitrogen oxides and, optionally, sulfur oxides, from waste gas streams simultaneously, in a single process. Moreover, in the present invention it is possible to treat the waste gas stream at a temperature at which it still has adequate buoyancy to obtain good plume rise from the stack. The sorbent of this invention removes $NO_2$, as well as the relatively inert NO, in an efficient manner.

The process of this invention also provides for the removal of nitrogen oxide and sulfur oxides from waste gases (which process produces elemental nitrogen and elemental sulfur or a non-polluting gaseous compound of nitrogen) wihout producing solid waste products which would create a disposal problem. The process of the present invention utilizes only relatively small quantities of natural gas or other hydrocarbon fuel.

Essentially, the process of the present invention comprises contacting a waste gas stream containing oxides of nitrogen and, optionally, sulfur with a sorbent comprising alumina and an "alkaline component" to sorb at least part of the nitrogen and sulfur oxides. The nitrogen- and sulfur-laden sorbent is then regenerated by heating the sorbent in a hydrogen-sulfide containing gas stream at temperatures up to about 750° C., whereby nitrogen is removed as elemental nitrogen or a non-polluting nitrogen compound such as nitrous oxide and sulfur is removed as elemental sulfur. The sulfur produced on regeneration may be partially used to produce hydrogen sulfide, preferably by catalytic reaction of the sulfur with hydrocarbon and water vapor at elevated temperatures, while the remainder of the sulfur is recovered. The regenerated sorbent is then used for further removal of oxides of sulfur and nitrogen.

The sorbent which has been discovered, according to the present invention, to be active for the simultaneous removal of nitrogen and sulfur oxide pollutants comprises a combination of alumina in the form of "activated alumina" and, as the "alkaline component", an alkaline form of an alkali or alkaline earth element.

"Activated alumina" in the present invention means a form of alumina with an extended surface area, usually above about 100 square meters per gram, and often as high as 400 or 500 square meters per gram. Many methods are known in the art whereby such forms of alumina may be prepared. For example, high surface area alumina may be precipitated from a sodium aluminate solution or sol by the addition of an acidic material such as carbon dioxide, mineral acid, or an acidic salt such as aluminum sulfate. Other methods of producing high surface area aluminas involve the dehydration of aluminum hydroxides such as aluminum hydrate ($Al(OH)_3$) or bauxite. Activated bauxite is a particularly useful source of alumina for the present invention because of its low cost. A further useful source of high-surface-area alumina for purposes of the present invention are the by-products from the hydrolysis of aluminum alkoxides such as aluminum triisopropoxide. Such aluminas which are characterized by extremely high purity in terms of the absence of other metallic elements, have recently become commercially available at relatively low cost.

The extended surface area requirement for the alumina component used in this invention is critical with respect to $SO_x$ removal and preferred with respect to $NO_x$ removal inasmuch as lower surface-area alumina, e.g. so-called "alkalized alumina" of, e.g., a surface area of 40 m$^2$/gm, does not result in the high efficiency of $SO_x$ removal over time that is achieved by the present invention. In fact, efforts for commercial use, for $SO_x$ removal, of alkalized alumina have been substantially abandoned because such materials did not stand up over extended, practical periods of usage.

However, for $NO_x$ removal, surface areas of 20 m$^2$/gm are operative, although an area of at least 100 m$^2$/gm is greatly preferred.

The alkaline component of the sorbent of the present invention may be advantageously incorporated as the hydroxide, carbonate, nitrate, acetate, or other soluble salt of a Group IA metal, or of a IIA metal of an atomic number greater than 4, with the atomic number of the metals not exceeding 56; more particularly, or a metal selected from the group consisting of lithium, modium, potassium, rubidium, cesium, magnesium, calcium, strontium, and barium; or mixtures thereof. The ratio of alkali or alkaline earth metal atoms (in the alkaline component) to aluminum atoms (in the activated alumina) in the sorbent of the present invention may be in the range from 5:95 to 60:40, although a preferred range is 10:90 to 40:60. The preferred metals in the alkaline component are sodium, potassium, and calcium, and sodium and potassium are most preferred, because of their excellent performance. It will be understood that mixed salts may be used as component (b); i.e., a mixture of salts (1) having the same metal but different anion portions, or (2) having the same anion but different metal portions, or (3) having different metal and anion portions, may be used. For instance, a mixture of sodium acetate and carbonate, or a mixture of potassium and sodium carbonates, or a mixture of potassium acetate and sodium carbonate may be advantageously employed as component (b).

The exact chemical or crystallographic form of the sorbent is not narrowly critical in the present invention, provided that the surface area of sorbent when prepared or after regeneration is at least about 100 square meters per gram. In fact, the sorbent probably changes in structure after regeneration as compared to its fresh condition. The alkaline component may be present as the oxide, hydroxide, carbonate, or aluminate, or mixtures of these compounds, when the sorbent is freshly prepared or after it has been regenerated. Various amounts of sulfur or nitrogen-containing salts may also be present, such as nitrates, nitrite, sulfate, sulfite, or sulfide.

The sorbent may be prepared by impregnating the high-surface-area activated alumina with a solution of the alkaline component; or by precipitation of the alumina in the presence of a soluble salt alkaline component, followed by heating; or by co-precipitation of alumina and the alkaline component from solution, followed by drying, according to methods which are well known in the art.

Various other metallic oxides, such as copper, iron, vanadium, zinc, molybdenum, or rare earth elements, may also be present in amounts up to about 10 atom percent, based on the total atoms of aluminum, alkaline component, and other metal(s).

The waste gas stream containing nitrogen and sulfur oxides is contacted with the sorbent at temperatures of 85° C. to about 200° C., and preferably about 90° to 150° C. At higher temperatures the efficiency of nitrogen oxide removal is decreased, while at lower temperatures the waste gas stream would require reheating or recompression to develop adequate stack plume.

The sorbent and waste gas may be contacted in a fixed bed, fluid bed, or moving bed, according to methods which are known in the art. The residence time necessary is in the range of 0.1 to about 10 seconds if the contacting is conducted in a fixed bed, but a wider range is possible in fluid bed operation.

After the sorbent has become laden with nitrogen and, optionally, sulfur, preferably to a level corresponding to a greater than about one equivalent of nitrogen plus sulfur for each five equivalents of alkaline component, it is regenerated. For this purpose one equivalent of sulfur is taken as one-half of a gram-atom, one equivalent of nitrogen is one gram-atom, one equivalent of alkali metal is one gram-atom, and one equivalent of alkaine earth metal is one-half of a gram-atom. The sorbent is regenerated by contacting with a regenerant gas stream containing at least 0.01 atmosphere partial pressure of hydrogen sulfide, at temperatures of about 350° to about 700° C., for a period of time sufficient to recover a substantial portion of the sorbent's capacity for nitrogen oxide and sulfur oxide sorption. The minimum time required for regeneration depends strongly on the temperature and partial pressure of hydrogen sulfide in the regenerant gas, and may vary from a few minutes at 750° C. to 12 hours or more at lower temperatures.

The regenerant gas preferably contains carbon dioxide or water vapor, and, more preferably, contains both carbon dioxide and water vapor. Alternatively, the sorbent is treated with carbon dioxide and/or water vapor after contacting with the hydrogen-sulfide containing regenerant gas. When carbon dioxide and/or water vapor are used, they are preferably employed in total amounts corresponding to at least about one mole of carbon dioxide and/or water vapor per mole of oxide gas sorbed before regeneration.

A convenient means of obtaining a suitable regenerant gas containing carbon dioxide is by the catalytic vapor phase reaction of steam, sulfur, and a hydrocarbon such as methane, essentially according to the reaction

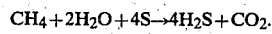

$$CH_4 + 2H_2O + 4S \rightarrow 4H_2S + CO_2.$$

For purposes of this invention, the use of hydrogen sulfide in the regenerant gas should be taken to include the use of other compounds which will essentially form hydrogen sulfide under the conditions of regeneration, viz. carbon disulfide or carbon oxysulfide in the presence of steam:

$$CS_2 + 2H_2O \rightleftharpoons CO_2 + 2H_2S,$$

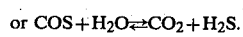

$$or\ COS + H_2O \rightleftharpoons CO_2 + H_2S.$$

During regeneration, sulfur forms in the regenerant stream and is condensed by cooling downstream from the sorbent. During this process at least part of the hydrogen sulfide is converted to elemental sulfur. Any unconverted hydrogen sulfide can be readily recycled after the sulfur has been condensed.

After the sorbent has been regenerated, it is cooled to the sorption temperature, for example, by contacting with a cooler waste gas stream. The sorbent is then re-used for removing sulfur and nitrogen oxides.

EXAMPLE 1

600 grams of a commercial activated alumina having $-10 + 20$ U.S. standard mesh size and surface area of about 200 square meters per gram was impregnated with a solution containing 61.7 grams of sodium carbonate and 360 grams of water. The mixture was dried in a rotary vacuum evaporator at 25° to 90° C., then heated 2 hours in air in an oven at 120° C.

22.5 grams of the sorbent was loaded into a 2 ft. by 1 inch diameter Vycor glass reactor heated by a temperature-controlled tube furnace. The temperature was adjusted to 100° C., and a simulated powder plant effluent gas was introduced having the following approximate volume composition: 80.1% $N_2$, 11.4% $CO_2$, 4.68% $H_2O$, 3.65% $O_2$, 0.16% $SO_2$, 0.036% NO, 0.004% $NO_2$. The flow rate was 55.0 liters per hour, measured at 25° C. and 1 atmosphere pressure.

Samples of the reactor effluent were periodically taken and analyzed for nitrogen oxides (NO+$NO_2$, expressed as $NO_x$), and for sulfur dioxide with the following results:

| Time on Stream, hours | % $NO_x$ Removal |
|---|---|
| 0.5 | 85.0 |
| 1.0 | 86.5 |
| 1.7 | 86.3 |
| 2.0 | 90.8 |
| 2.6 | 94.5 |
| 3.0 | 91.9 |
| 3.5 | 94.7 |
| 4.5 | 93.5 |
| 5.5 | 94.5 |
| 6.5 | 90.0 |
| 7.3 | 93.6 |
| 7.8 | 94.7 |
| 8.8 | 97.0 |
| 10.0 | 96.2 |

| Time on Stream, hours | % $SO_2$ Removal |
|---|---|
| 2.4 | 97.0 |
| 5.2 | 89.0 |
| 10.0 | 42.0 |

Percent $NO_x$ removal is taken as $$100 \left(1 - \frac{NO_x \text{ effluent concentration}}{NO_x \text{ influent concentration}}\right) \%;$$

similarly for percent $SO_2$ removal.

After 26.0 hours on stream $NO_x$ removal was 50.1%. After 16.7 hours on stream, $SO_2$ removal was 18.0%.

The sorbent was then regenerated by heating the reactor to 500° C. in $N_2$, then introducing a stream containing 9% $H_2S$ and 91% $N_2$ at about 20 liters/hour for 6 hours. Sulfur was condensed downstream from the sorbent bed. The sorbent was then cooled in nitrogen to 100° C.

EXAMPLE 2

A second sorption run was conducted on the generated sorbent from Example 1, using the same conditions and feed stream composition. The results were as follows:

| Time on Stream, hours | % $NO_x$ Removal |
|---|---|
| 1.0 | 100.0 |
| 2.0 | 100.0 |
| 3.0 | 100.0 |
| 4.0 | 89.3 |
| 5.0 | 94.9 |
| 6.0 | 94.0 |
| 8.0 | 91.0 |
| 9.3 | 91.8 |
| 10.0 | 84.4 |
| 11.0 | 79.5 |
| 12.0 | 63.3 |
| 13.0 | 58.5 |

| Time on Stream, hours | % $SO_2$ Removal |
|---|---|
| 0.5 | 100.0 |
| 1.5 | 84.4 |
| 3.3 | 21.6 |
| 4.5 | 18.2 |

Thus, it is evident that the sorbent is highly efficient for $NO_x$ removal for periods in excess of 10 hours, and efficient for $SO_2$ removal for several hours. Also, the sorbent was effectively regenerated by treatment with hydrogen sulfide.

EXAMPLE 3

The spent sorbent of Example 2 was regenerated by heating at 500° C. in 9% $H_2S$–91% $N_2$ for 6 hours at 20 liters/hour or regenerant gas. The sorbent was then cooled to 100° C. in a stream containing 95% $N_2$ and 5% $N_2O$. In a third sorption cycle similar to that of Example 1, the results were:

| Time on Stream, hours | % $NO_x$ Removal |
|---|---|
| 1.5 | 100.0 |
| 4.5 | 100.0 |
| 5.5 | 99.9 |
| 6.5 | 92.9 |
| 7.8 | 90.4 |

| Time on Stream, hours | % $SO_2$ Removal |
|---|---|
| 1.8 | 100.0 |
| 5.3 | 41.2 |
| 7.0 | 15.7 |

Thus, it is evident that the use of steam in conjunction with the regeneration effected the recovery of more of the sorbent's efficiency for $SO_2$ removal, than in Example 2 in which the regeneration was conducted without steam.

EXAMPLE 4

Sorbents were prepared by depositing carbonate, nitrate, or acetate salts of each of the following metals, on activated alumina: Ca, K, Sr, Ba, Mg. In each case the amount of alkaline component deposited corresponding to about 1 milligram-mole of the metal oxide (CaO, K$_2$O, SrO, BaO, MgO, respectively) per gram of sorbent. The sorbents exhibit good efficiency for NO$_x$ and SO$_2$ removal, and are regenerable.

It will be understood that the specification and examples are illustrative but not limitative of the present invention and that other embodiments within the spirit and scope of the invention will suggest themselves to those skilled in the art.

What is claimed is:

1. A method for removing sulfur oxides and nitrogen oxides from a sorbent comprising alumina having a surface area of at least 20 square meters per gram and an alkaline component comprising an oxide, hydroxide or salt of a Group IA or IIA metal of atomic number not exceeding 56 which sorbent contains both sulfur oxides and nitrogen oxides which comprises:
    (a) contacting said sulfur oxide and nitrogen oxide-containing sorbent in a regeneration zone with a regenerant gas stream containing at least 0.01 atmosphere partial pressure of hydrogen sulfide at a temperature of about 350° to about 750° C. for a period of time sufficient to recover a substantial portion of the sorbent's capacity for nitrogen oxide and sulfur oxide sorption;
    (b) withdrawing nitrogen oxide formerly contained on said sorbent in the form of elemental nitrogen, or a non-polluting nitrogen compound; and
    (c) withdrawing sulfur oxides formerly contained on said sorbent in the form of elemental sulfur.

2. A process according to claim 1, wherein the surface area of said alumina is at least 100 square meters per gram.

3. A process according to claim 1, wherein the weight ratio of alkali or alkaline earth metal atoms in the alkaline component to alumina atoms in the alumina is 5:95 to 60:40.

4. A process according to claim 3, wherein said alkaline component is in the form of an oxide.

5. A process according to claim 4, wherein said oxide is sodium oxide.

6. A process according to claim 4, wherein said oxide is potassium oxide.

7. A process according to claim 3, wherein said alkaline component is in the form of a carbonate.

8. A process according to claim 7, wherein said carbonate is in the form of sodium carbonate.

9. A process according to claim 7, wherein said carbonate is potassium carbonate.

10. A process according to claim 3, wherein said alkali or alkaline earth metal is in the form of a hydroxide.

11. A process according to claim 3, wherein said alkali or alkaline earth metal is in the form of a nitrate, acetate or aluminate.

12. A process according to claim 3, wherein the Group IA or IIA metal is selected from the group consisting of lithium, sodium, potassium, rubidium, cesium, magnesium, calcium, strontium and barium; or mixtures thereof.

13. A process according to claim 12, wherein the surface area of the alumina is from about 400 to 500 square meters per gram.

14. A process according to claim 1, wherein the so-regenerated sorbent is thereafter contacted with a gaseous stream containing both oxides of sulfur and oxides of nitrogen, whereby the sorbent absorbs such oxides of sulfur and oxides of nitrogen.

15. A process according to claim 14, wherein the sorption of oxides of sulfur and oxides of nitrogen is effected at a temperature of 85° to 200° C.

16. A process according to claim 15, wherein the waste gas stream containing nitrogen and sulfur oxide is contacted with the sorbent at temperatures of about 90° to 150° C.

17. A process according to claim 15, wherein the sorbent and waste gas are contacted in a fixed bed.

18. A process according to claim 15, wherein the sorbent and waste gas are contacted in a fluid bed.

19. A process according to claim 15, wherein the sorbent and waste gas are contacted in a moving bed.

20. A process according to claim 15, wherein the regenerant gas contains carbon dioxide.

21. A process according to claim 15, wherein the regenerant gas contains water vapor.

22. A process according to claim 15, wherein after the sorbent is treated with the hydrogen sulfide-containing regenerant gas, it is treated with carbon dioxide and/or water vapor.

23. A process according to claim 15, wherein the elemental sulfur produced on regeneration is thereafter used to produce hydrogen sulfide.

24. A process according to claim 18, wherein the hydrogen sulfide is obtain by catalytic reaction of sulfur with hydrocarbon and water vapor at an elevated temperature.

25. A process according to claim 15, wherein the regenerant gas stream comprises a mixture of hydrogen sulfide and nitrogen.

26. A process according to claim 1, wherein nitrogen oxides are removed in the form of elemental nitrogen.

27. A method for removing sulfur oxides and nitrogen oxides from a sorbent containing both sulfur oxides and nitrogen oxides which consists essentially of:
    (a) Contacting said sulfur oxide and nitrogen oxide-containing sorbent in a regeneration zone with a regenerant gas stream containing at least 0.01 atmosphere partial pressure of hydrogen sulfide at a temperature of about 350° to about 750° C. for a period of time sufficient to recover a substantial portion of the sorbent's capacity for nitrogen oxide and sulfur oxide sorption;
    (b) Withdrawing nitrogen oxide formerly contained on said sorbent in the form of elemental nitrogen, or a non-polluting nitogen compound; and
    (c) Withdrawing sulfur oxides formerly contained on said sorbent in the form of elemental sulfur.

28. A process according to claim 27, wherein said sorbent is alumina having a surface area of at least 20 square meters per gram and an alkaline component comprising an oxide, hydroxide or salt of a Group Ia or IIA metal of atomic number not exceeding 56.

29. A process according to claim 27, wherein nitrogen oxides are removed in the form of elemental nitrogen.

30. A method for the removal of sulfur oxides and nitrogen oxides from a gas-containing them which comprises contacting said gas at a temperature of 85° C. to about 200° C. with a sorbent, which sorbent comprises:
    (a) an alumina component comprising alumina having a surface area of at least about 20 square meters per gram; and
    (b) an alkaline component comprising at least one oxide, hydroxide or salt of a Group IA or Group IIA metal of atomic number not exceeeding 56 and, thereafter, removing nitrogen oxides and sulfur oxides from said sorbent by:
(c) contacting the nitrogen oxide and sulfur oxide containing sorbent in a regeneration zone with a regenerant gas stream containing at least 0.01 atmosphere partial pressure hydrogen sulfide at a temperature of about 350° to about 750° C. for a period of time sufficient to recover a substantial portion of the sorbent's capacity for nitrogen oxide and sulfur oxide sorption;
(d) withdrawing nitrogen oxides formerly contained on said sorbent in the form of elemental nitrogen;
(e) withdrawing sulfur oxides formerly contained on said sorbent in the form of elemental sulfur.

31. A process according to claim 1, wherein said alkaline component comprises an oxide, hydroxide, or salt of a Group IA metal of atomic number not exceeding 56.

32. A process according to claim 31, wherein said metal is sodium.

33. A process according to claim 31, wherein said metal is potassium.

34. A process according to claim 32, wherein said alkaline component is in the form of a salt.

35. A process according to claim 33, wherein said alkaline component is in the form of a salt.

36. A process according to claim 31, wherein said salt is a carbonate, acetate, nitrate or aluminate of sodium.

37. A process according to claim 35, wherein said salt is a carbonate, acetate, nitrate or aluminate of potassium.

38. A process according to claim 32, wherein said sodium is in the form of sodium oxide.

39. A process according to claim 33, wherein said potassium is in the form of potassium oxide.

40. A process according to claim 32, wherein said sodium is in the form of sodium hydroxide.

41. A process according to claim 33, wherein said potassium is in the form of potassium hydroxide.

42. A process according to claim 1, wherein said metal is magnesium.

43. A process according to claim 42, wherein said magnesium is in the form of an oxide.

44. A process according to claim 42, wherein said magnesium is in the form of a hydroxide.

45. A process according to claim 42, wherein said magnesium is in the form of a salt.

46. A process according to claim 45, wherein said salt is a carbonate, acetate, nitrate, or aluminate of magnesium.

47. A process according to claim 30, wherein said alkaline component comprises an oxide, hydroxide, or salt of a Group IA metal of atomic number not exceeding 56.

48. A process according to claim 47, wherein said metal is sodium.

49. A process according to claim 47, wherein said metal is potassium.

50. A process according to claim 48, wherein said alkaline component is in the form of a salt.

51. A process according to claim 49, wherein said alkaline component is in the form a salt.

52. A process according to claim 50, wherein said salt is a carbonate, acetate, nitrate or aluminate of sodium.

53. A process according to claim 51, wherein said salt is a carbonate, acetate, nitrate or aluminate of potassium.

54. A process according to claim 48, wherein said sodium is in the form of sodium oxide.

55. A process according to claim 49, wherein said potassium is in the form of a potassium oxide.

56. A process according to claim 48, wherein said sodium is in the form sodium hydroxide.

57. A process according to claim 49, wherein said potassium is in the form of potassium hydroxide.

58. A process according to claim 30, wherein said metal is magnesium.

59. A process according to claim 58, wherein said magnesium is in the form of an oxide.

60. A process according to claim 58, wherein said magnesium is in the form of a hydroxide.

61. A process according to claim 58, wherein said magnesium is in the form of a salt.

62. A process according to claim 61, wherein said salt is a carbonate, acetate, nitrate or aluminate of magnesium.

* * * * *